H. H. KOLLOSTER.
ZONE INDICATOR.
APPLICATION FILED JULY 12, 1917.

1,301,273.

Patented Apr. 22, 1919.

Inventor
H. H. Kolloster,
By Talbert & Parker
Attorneys

ZONE-INDICATOR.

1,301,273.

Specification of Letters Patent.  Patented Apr. 22, 1919.

Application filed July 12, 1917. Serial No. 180,158.

UNITED STATES PATENT OFFICE.

HERMAN H. KOLLOSTER, OF PALATKA, FLORIDA.

*To all whom it may concern:*

Be it known that I, HERMAN H. KOLLOSTER, a citizen of the United States, residing at Palatka, in the county of Putnam and State of Florida, have invented certain useful Improvements in Zone-Indicators, of which the following is a specification, reference being had therein to the accompanying drawing.

The present invention relates broadly to indicators and more particularly has reference to a zone indicating device especially adapted for use in connection with the parcel post system.

It is the principal aim and object of the present invention to provide novel coöperative zone indicating means adjustably mounted with respect to a board having a map printed or otherwise marked thereon and scaled correspondingly to the indicating means whereby a sender of the parcel post package who is familiar with the rates can quickly and accurately determine the exact cost of mailing the package from one place to another.

As an additional object this invention contemplates the provision of a novel zone indicating bar provided with means indicative of the various zones and adapted to be adjusted so as to be held at the place from where a package is to be mailed and swung so as to indicate the zone in which the place to which the package is to be mailed is situated.

The invention as a further aim resides in the provision of novel coöperative means for slidably and swingingly mounting the adjusting means and for holding said means in various positions of adjustment.

It is a more specific object of this invention to construct an improved frame for supporting both the map and the indicating means.

Among the other aims and objects of this invention may be recited the provision of a device of the character mentioned in which the number of parts is few, the construction simple, the cost of production low and the efficiency high.

Other objects as well as the nature, characteristic features and scope of this invention will be more readily apparent from the following description taken in connection with the accompanying drawings and pointed out in the claims, forming a part of this specification.

The invention is clearly illustrated in the accompanying drawings, in which—

Similar reference characters are employed in all of the above described views, to indicate corresponding parts.

Figure 1:
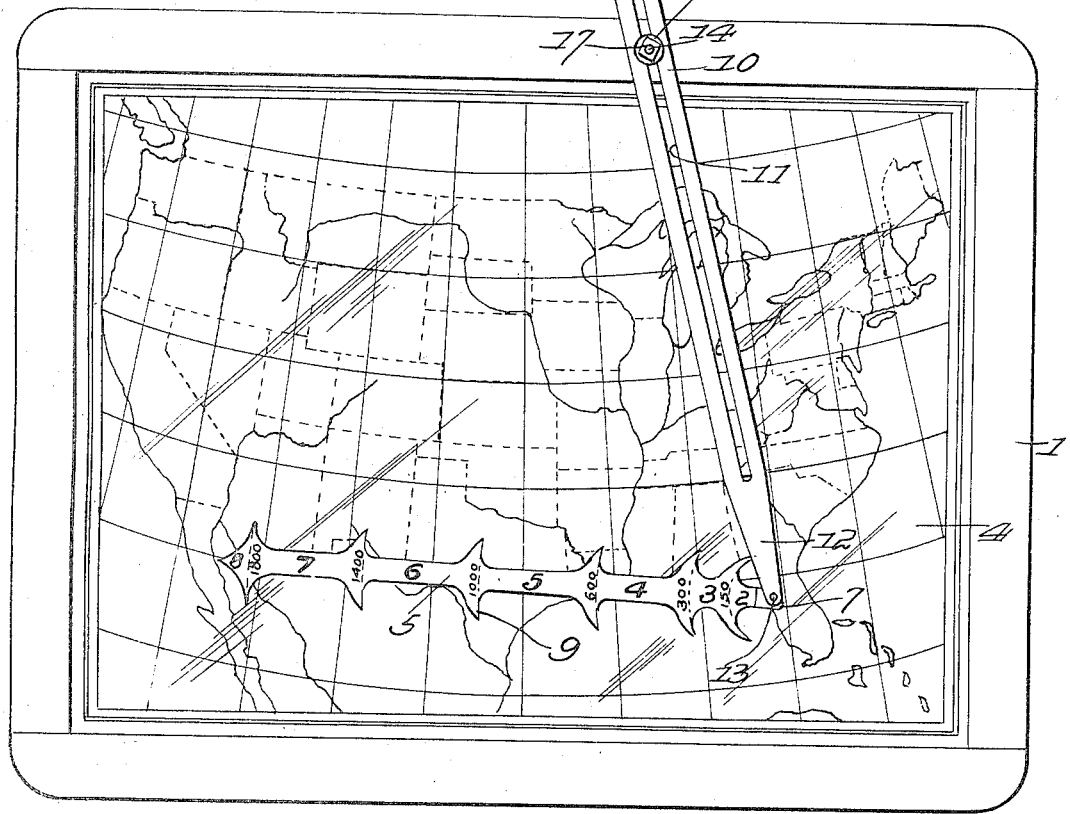
Figure 1 is a top plan view of the invention.
Figure 2:
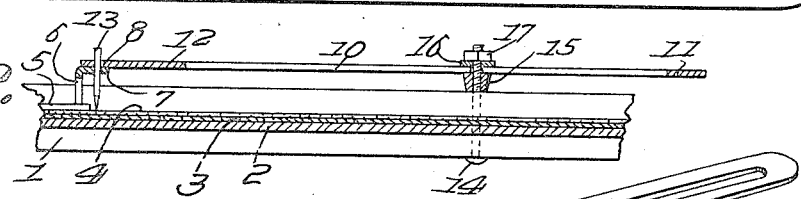
Fig. 2 is a sectional detail.
Figure 3:
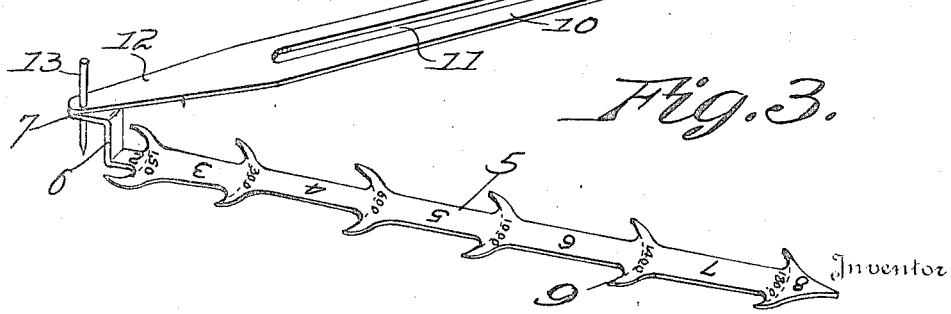
Fig. 3 is a perspective detail of the indicating means.

Referring now, more particularly, to the accompanying drawings there is provided a frame 1 which may be and preferably is of a rectangular configuration. A board 2 is suitably supported in the frame and has marked on its upper surface a map 3 indicative, in this instance, of the United States. Also mounted in the frame over the upper surface of the map is a sheet of transparent material 4.

With a view toward providing the improved coöperative indicating means a zone indicating bar 5 is employed, the inner end of which is bent to provide an upright portion 6 while extending at a right angle from the upper end of the upright portion is an ear 7 which has an opening 8 therein for a purpose that will presently appear. Projecting at opposite points from the opposite marginal edges of the body are arcuate indicating pointers 9 which are indicative of the several zones employed in the parcel post system. As will be appreciated each pair of pointers 9 are arranged in suitably spaced relation with respect to each other, the distance between each pair increasing toward the outer end. As is understood there are eight zones in the present parcel post system and in reducing this invention to practice, it is to be understood that the distance or space from the point directly beneath the opening 8 in the ear to the upright 6 is indicative of the first zone while the distance from the upright to the first pair of pointers 9 is indicative of the second zone. The distance between the first pair of pointers 9 and the second pair of pointers 9 is indicative of the third zone and, of course, the distance between the second pair of pointers 9 and the third pair of pointers 9 is indicative of the fourth zone and so on until the usual eight zones are indicated by the remaining pointers.

As indicated, improved means have been provided for adjustably supporting the bar with respect to the map. In carrying out this feature of the invention an adjustable bar 10 is provided which has a longitudinal slot 11 extending approximately throughout its entire length, one end 12 of the bar being formed with an opening while a vertical pin 13 is arranged through the opening in the end 12 and also through the opening 8. The lower end of this pin 13 is arranged in the plane of the lower surface of the bar 5 and is adapted to be placed upon the town or city from which the mail is to be sent to consequently enable the user to swing the bar 5 so as to determine in which zone the place to which the mail is to be sent is situated.

In order to support the adjusting bar 10 on the frame 1 to permit of sliding and pivotal adjustment thereon a bolt 14 is extended through the frame and projects above the upper surface thereof being engaged by a clamping washer 15. The bar 10 is now placed about the bolt so that the bolt will operate in the slot 11 to permit of pivotal and sliding movement, while another washer 16 is disposed on the bolt. A suitable adjustable element such as a nut 17 serves to clamp the bar 10 between the washers 15 and 16 subsequent to the adjustment of the bar 10.

The mode of operation of the invention is as follows: By loosening the nut 17 the bar 10 is swung and slid so that the pin 13 may be positioned directly over the city or town from which the mail is to be sent whereupon the nut 17 is tightened so as to clamp the bar and consequently hold the pin in a substantially stationary position. Inasmuch as the bar 5 is movable with the bar 10 and is swingable with respect thereto by reason of its connection with the pin 13 it will be apparent that it is only necessary to swing the bar 5 about the upper surface of the transparent material, if such is employed, and determine in which zone the city to which the mail is to be sent is situated.

As many changes could be made in the above construction and many apparently widely different embodiments of this invention could be made without departing from the scope thereof, and it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention which as a matter of language might be said to fall therebetween.

Having thus fully described this invention, what is claimed as new, is:

1. A device of the character described including a base having a map indicated on the upper face, a town locating bar slidably and pivotally connected near one edge of the base, a zone indicating bar scaled correspondingly to the map and having one end pivoted to one end of the town locating bar and being properly positioned by the town locating bar, and means for clamping the town locating bar in a substantially rigid position relative to the base subsequent to adjustment.

2. A device of the character described including a frame, a board mounted therein and having a map printed on the upper face thereof, a bar, opposed pairs of pointers projecting from the opposite marginal edges of the bar and indicative of various zones, a slotted bar, a pin projecting through the slotted bar and pivotally supporting the zone indicating bar, a bolt carried by the frame and engaged to the sliding bar so as to coöperate with the slot in slidably and pivotally mounting the bar on the frame, and means for clamping the slotted bar in various adjusted positions with respect to the map.

3. A device of the character described including a frame, a board supported in the frame and having a map indicated on its upper face, a bar, opposed pairs of pointers projecting from opposite marginal edges of the bar at suitably spaced intervals and indicative of various zones, an upright portion on one end of the bar, an ear projecting from the upright and provided with an opening, an adjustable bar having a longitudinal slot therein, a pin carried by the adjustable bar and pivotally engaged in the opening in the ear, a bolt carried by the frame for engagement with the adjustable bar to permit of sliding and pivotal movement thereof, means for clamping the adjustable bar in a substantially rigid position to hold the pin over the place from which mail is to be sent to consequently permit of the swinging of the zone indicating bar in determining the zone in which the place to which the mail is to be sent is situated.

In testimony whereof I affix my signature.

HERMAN H. KOLLOSTER.